United States Patent [19]
Moen

[11] 3,840,048
[45] Oct. 8, 1974

[54] SEAL CONSTRUCTION
[75] Inventor: Alfred M. Moen, Grafton, Ohio
[73] Assignee: Stanadyne, Inc., Windsor, Conn.
[22] Filed: Nov. 3, 1972
[21] Appl. No.: 303,543

Related U.S. Application Data
[63] Continuation-in-part of Ser. No. 268,542, July 3, 1972, abandoned, which is a continuation-in-part of Ser. No. 147,358, May 27, 1971, abandoned.

[52] U.S. Cl. ......... 137/625.41, 137/454.6, 251/172, 251/363
[51] Int. Cl. ............................................. F16k 11/02
[58] Field of Search ........... 251/363, 361, 325, 317, 251/309, 310, 172, 175, 174; 137/625.22, 625.23, 625.27, 625.47, 625.32, 454.6, 636.4, 625.41

[56] References Cited
UNITED STATES PATENTS

| | | | |
|---|---|---|---|
| 2,732,170 | 1/1956 | Shand | 251/172 |
| 2,923,310 | 2/1960 | Bletcher et al. | 137/454.6 |
| 3,173,444 | 3/1965 | Bucknell et al. | 137/454.6 |
| 3,661,181 | 5/1972 | Palmer et al. | 137/625.17 |
| 3,700,006 | 10/1972 | Marcillaud | 251/172 |

Primary Examiner—Henry T. Klinksiek
Attorney, Agent, or Firm—Kinzer, Plyer, Dorn & McEachran

[57] ABSTRACT

A seal for use in a valve construction which has a member movable relative to a sleeve valve member and a housing enclosing the movable member and valve member. The seal has a port seal portion which extends through a port in the valve member with the inner rim of the port seal portion being in sealing contact with the movable member. Means are provided for biasing the port seal portion into sealing contact with the movable member.

8 Claims, 16 Drawing Figures

PATENTED OCT 8 1974 3,840,048
SHEET 1 OF 4
fig.1.
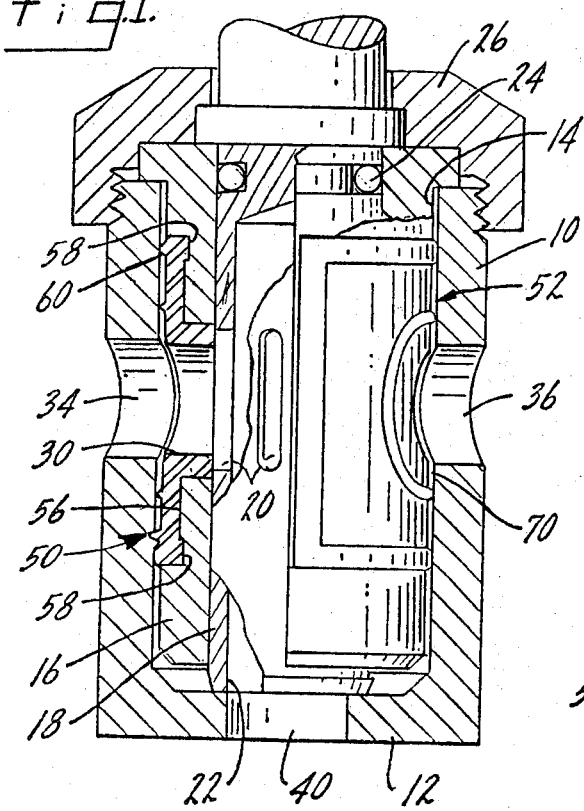
fig.2.
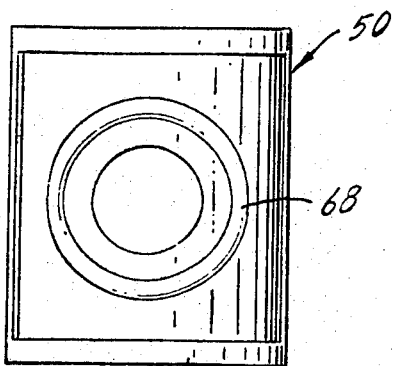
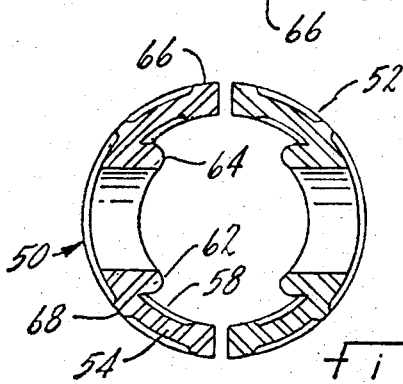
fig.3.
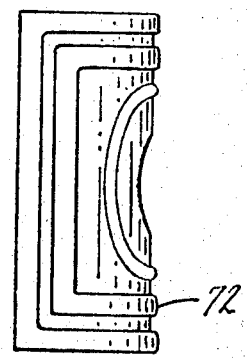
fig.4.

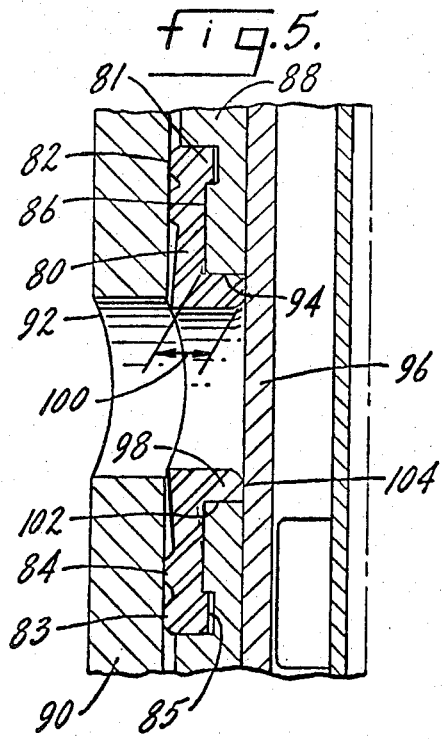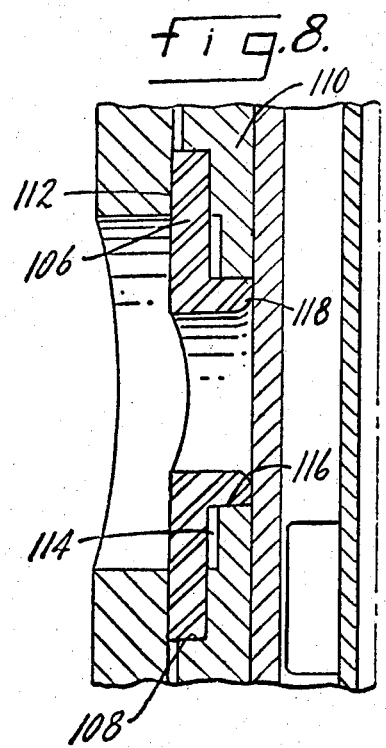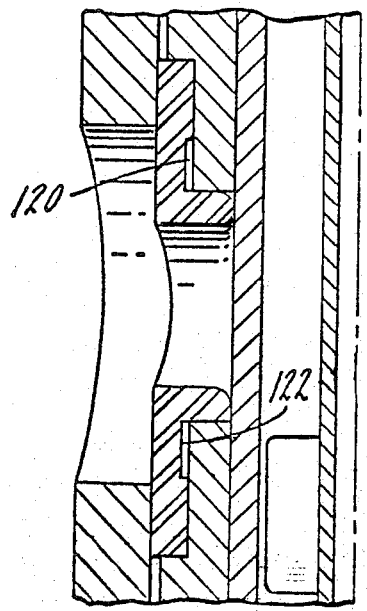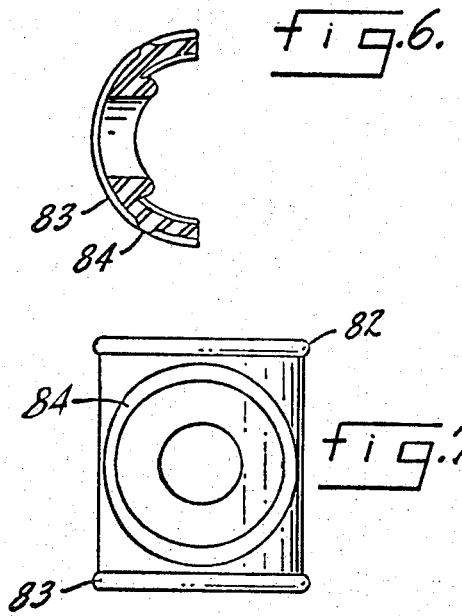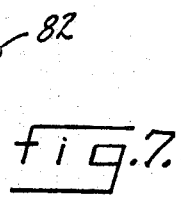

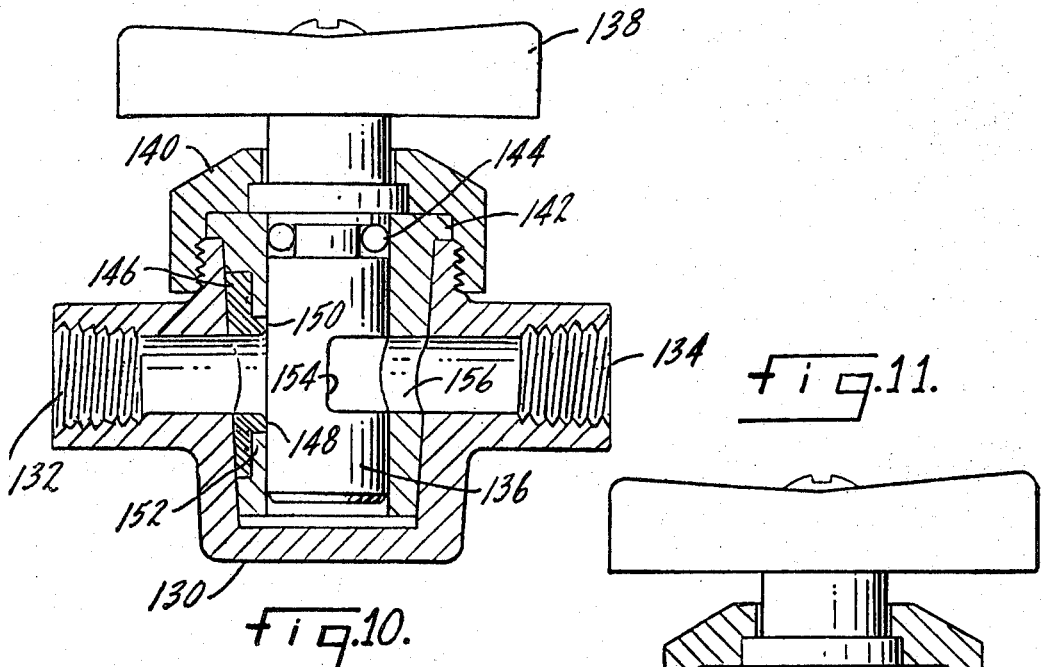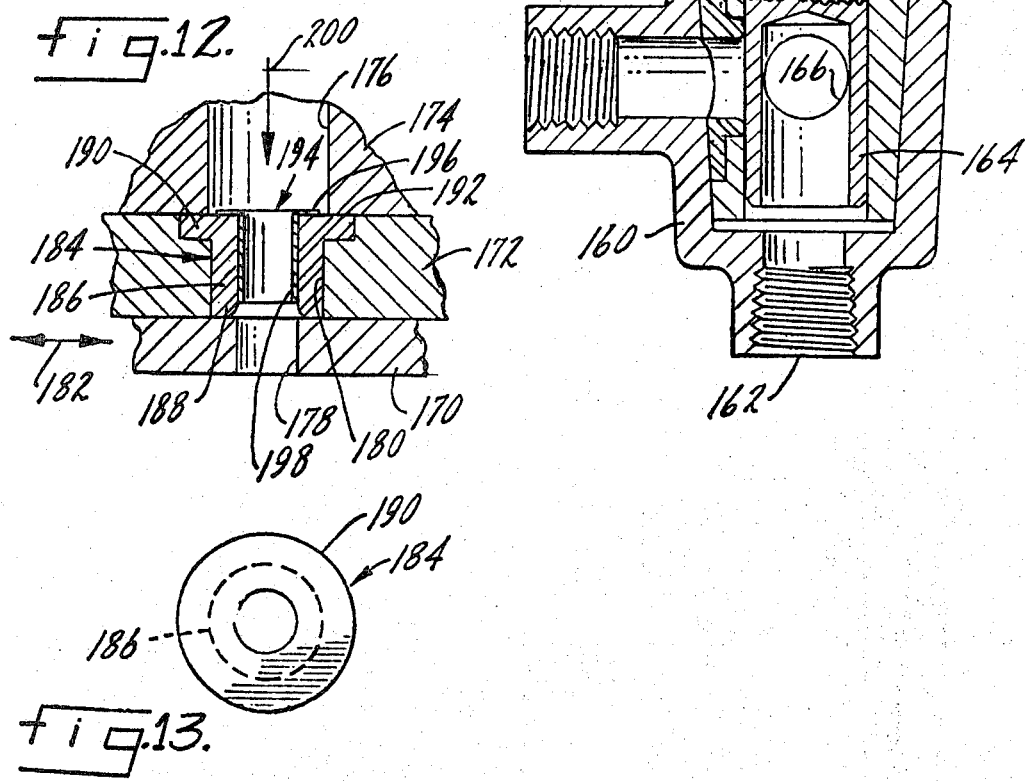

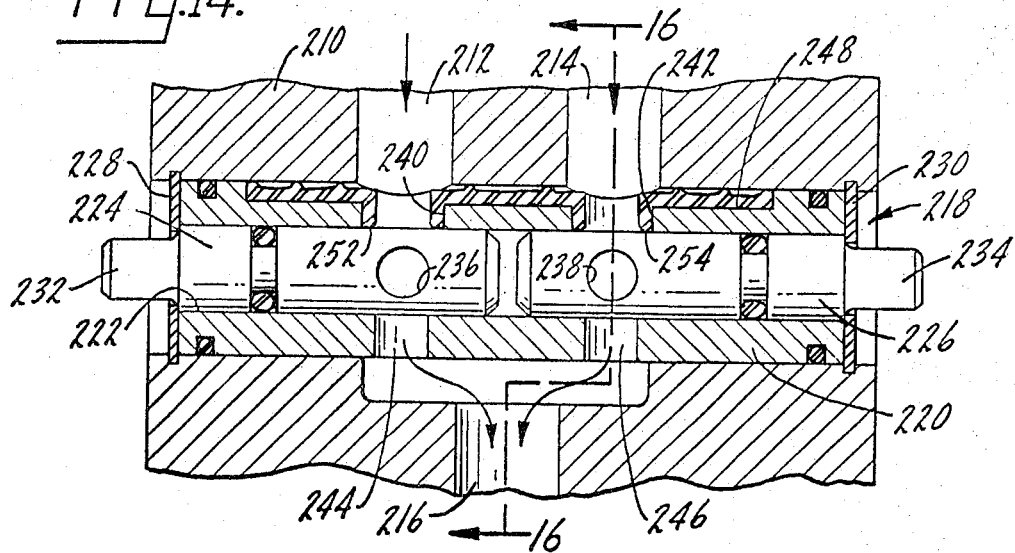
Fig. 14.
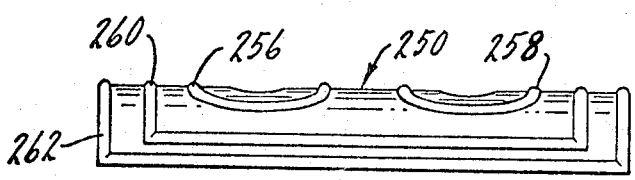
Fig. 15.
Fig. 16.

SEAL CONSTRUCTION

This application is a continuation-in-part of our co-pending application Ser. No. 268,542, filed July 3, 1972, which was a continuation-in-part of application Ser. No. 147,358, filed May 27, 1971, both now abandoned.

SUMMARY OF THE INVENTION

The present invention relates to a seal for use in a fluid valve and particularly to a seal construction in which fluid flowing through the valve creates a pressure urging the seal into firm contact with a portion of the valve.

Another purpose is a seal of the type described having a port seal portion with the fluid creating a pressure behind the port seal portion to urge it into sealing contact with a movable piston.

Another purpose is a seal construction of the type described in which the port seal portion has a rim cross section providing minimum frictional contact between the seal and piston.

Another purpose is a seal construction which has sealing areas effective against three different parts.

Another purpose is a seal construction which is anchored in position, preventing the seal from being forced through a valve discharge opening.

Another purpose is a seal construction which permits the seal and valve to be passed by an opening without damage to the seal.

Another purpose is a seal construction which seals by differential pressure.

Another purpose is a seal construction of the type described which seals by flexing of the sealing member.

Another purpose is a seal of the type described which seals by squeezing of the seal member.

Another purpose is a seal construction having a body portion positioned about a sleeve, a port seal portion extending through ports in the sleeve, and a peripheral bead extending outwardly from the body portion into sealing contact with the interior surface of the valve housing.

Other purposes will appear in the ensuing specification, drawings and claims.

DESCRIPTION OF THE PRIOR ART

In U.S. Pat. No. 3,532,123 a fluid valve includes a sleeve and a valve member or stem reciprocal and rotatable relative to the sleeve. A rubber covering is vulcanized or bonded to the inside and outside of the sleeve with integral portions of the inner and outer coverings extending through the sleeve inlet and outlet ports. The inner seal covering surrounds the movable stem and provides a seal with the stem by means of pressure from the elastic sealing material. Because the rubber covering is vulcanized or bonded to the sleeve, water pressure does not affect the sealing pressure applied by the seal against the stem. There is no movement between the seal and the sleeve and thus sealing pressure is developed by the elasticity of the seal itself. A major disadvantage of such a construction is that the amount of sealing pressure applied to the stem does not permit free uninhibited movement of the stem relative to the sleeve.

In U.S. Pat. No. 3,103,231 a fluid valve construction includes a sleeve and movable stem. There is a seal member for each of the sleeve inlet ports, which seal member is bonded to the sleeve and is in sealing contact with the stem, sleeve and the housing surrounding the sleeve. The sealing pressure applied to the stem is developed by the elasticity of the sealing material and the pressure of the fluid flowing through the ports does not affect the amount of sealing pressure. Because the seal is bonded to the sleeve there is no independent movement of the seal relative to the sleeve and hence no water implemented sealing pressure applied to the stem.

BRIEF DESCRIPTION OF THE DRAWINGS

The invention is illustrated diagrammatically in the following drawings wherein:

FIG. 1 is an axial section through a fluid valve, with portions broken away for clarity, FIG. 2 is a side elevation of one of the two identical parts making up the seal construction, FIG. 3 is a section through the seal parts, FIG. 4 is a side elevation showing a modified form of the invention, FIG. 5 is a partial axial section showing a further modified form of the invention, FIG. 6 is a section of the seal in FIG. 5, FIG. 7 is a side view of the seal in FIG. 6, FIG. 8 is a partial axial section, similar to FIG. 5, showing yet a further modified form of the invention, FIG. 9 is a partial axial section, similar to FIGS. 5 and 6, showing yet another modified form of the invention, FIG. 10 is a section showing a further modified form of the invention, FIG. 11 is a section similar to FIG. 10 showing an additional form of the invention, FIG. 12 is a partial section through a modified form of the invention, FIG. 13 is a top plan view of the seal of FIG. 12, FIG. 14 is a section through a further modified form of the invention, FIG. 15 is a side view of the seal of FIG. 14, and FIG. 16 is a section along plane 16—16 of FIG. 14.

DESCRIPTION OF THE PREFERRED EMBODIMENT

The seal construction shown is usable in many valve applications. The invention should not be limited to use in any particular type of valve as the basic sealing principles disclosed herein have wide application in the valve field.

FIG. 1 shows one use of the basic sealing concept disclosed. A housing is indicated at 10 and may be generally cylindrical in form, with a bottom 12 and an open top 14. Positioned within the housing 10 is a mixing valve which includes a sleeve 16 and an inner stem 18. The stem 18 is rotatable relative to the sleeve to control the passage of fluid from the valve. A cap or cover 26 may be threaded onto the exterior of the housing 10 and an operating handle may conveniently be attached to the outward end of the stem 18.

The stem or piston 18 is hollow and may have inlet ports 20, thereby forming a mixing means for the entering fluid, and a bottom outlet 22. A seal ring 24, positioned about the exterior of the stem forms a seal between the stem and the interior of the sleeve 16.

The sleeve 16 may include a pair of fluid inlet ports, one of which is indicated at 30, which are generally in alignment with inlet ports 34 and 36 in the housing 10. When used as a mixing valve, the ports 34 and 36 will carry dissimilar fluids toward the sleeve inlet ports and the hollow stem. The bottom of the sleeve is open and is in communication with the housing bottom outlet 40.

The seal construction disclosed herein may be formed in two identical parts or halves indicated at 50 and 52. Each of the seal halves includes a body portion 54 positioned within a recess on the sleeve indicated at 56. The sleeve sections 50 and 52, which together form a cylinder, may have an interior inwardly-directed shoulder at each end, indicated at 58, which is positioned within a mating groove 60 on the exterior of the sleeve. The combination of the shoulders 58 and the grooves 60 is effective to anchor the seal to the sleeve to permit the sleeve to be inserted and removed from the housing. Because the sleeve is anchored, it prevents any possibility of it being forced through a discharge port by a sudden change in pressure.

There is an inwardly-directed port seal portion 62 which extends into each of the sleeve inlet ports, one of which is indicated at 30. The port seal portions take on the shape of the ports, for example circular, oval or rectangular, and may have an interior rim 64, preferably shaped to have minimum contact with the piston or stem 18. The advantage of minimum effective contact is that it keeps friction between the piston and seal at a minimum. It is important that the piston be free to rotate within the sleeve for valve control. Each of the seal halves 50 and 52 have a peripheral bead 66 which extends along the ends of each half and along the axially extending edges so as to form a complete seal between the sleeve and the interior of the housing. A second bead 68 extends about each port seal portion 62, but is spaced away from the edge of the port seal portion to define, with the interior of the housing 10, a chamber 70. Each of the chambers 70 are directly in alignment with the port seal portions 62 so that fluid present at the ports, in both open and closed positions, is effective to flow into the chambers and thereby create inwardly-directed pressure on the port seal portions 62 and thus firmly urge the rims 64 into sealing contact with the piston 18. Bead 66 forms a peripheral seal between the sleeve and housing. Bead 68 assists in forming a seal between the interior of the housing and exterior of the seal and defines the chamber 70 which creates inwardly-directed pressure to firmly urge the rim 64 into sealing contact with the piston 18.

In the open position of the valve beads 66 and 68 prevent exterior seepage and cross flow. In the closed position both the beads and the port seals are effective to prevent seepage and cross flow.

The modification of FIG. 4 includes a second peripheral bead 72 which adds further peripheral sealing area to the seal halves 50 and 52. In some constructions, the second bead 72 will not extend peripherally about each half, but will only extend along the ends, there being no necessity of having a double bead along the mating edges of the two halves.

In the half section of FIGS. 5, 8 and 9, only that portion of the valve adjacent the seal has been shown. As was true in the other forms of the invention, the seal construction may be made up of two substantially identical parts. The seal member 80 of FIG. 5 may have a top bead 82, a bottom bead 83, a circular bead 84 and may be positioned in a recess 86 formed in the exterior of the sleeve 88. Outer beads 82 and 83 are substantially the same as bead 68. Inwardly-directed shoulders 81 at opposite ends of the seal stop short of completely filling grooves 85, thus leaving a small space. Thus, when the valve is inserted or removed, the seal may collapse when moving past the ports to avoid puckering or damaging it. The housing 90 may have a port 92 which will direct water inwardly through the port 94 in the sleeve toward the reciprocal and rotatable stem 96. The seal 80 has a port seal portion 98, which as shown in the drawing, has an axial extension, the length of which is designated at 100, greater than the width of the surface 102 forming the edge of the port 94 in the sleeve 88. Thus, when the valve is in the closed position illustrated in the drawings, the port seal portion will be forced outwardly by the stem. The seal is distorted away from its natural position, which distortion creates an inwardly-directed force to firmly hold the inner rim 104 of the port seal portion in sealing contact with the stem 96. Since the stem bends the seal away from its natural position, there is an increased force, or a biasing force, which tends to firmly urge the seal rim 104 into sealing contact with the stem. Also, since the seal is longer than necessary, there is compensation for seal wear.

In FIG. 8, a seal 106 is positioned in a recess 108 in the outer surface of the sleeve 110. The outer surface 112 of the seal 106 is in sealing contact with the inner surface of the housing. There are no sealing beads as were shown in FIG. 5. The seal surface is flat. A chamber 114 is formed by relieving that portion of the sleeve recess 108 adjacent the port 116. The chamber 114, which is peripheral and extends about the port 116, will not be filled with fluid as it will be closed by the seal 106. However, fluid within the housing port will force the body of the seal toward the sleeve reducing the size of the chamber 114, thus urging the port seal area 118 into firm contact with the stem. The seal will partially close chamber 114 because of the force of the fluid within the valve and as the seal reduces the chamber, it naturally pushes the port seal area 118 into firm contact with the stem. As was the case with rim 104, the port seal area 118 will compensate for seal wear.

FIG. 9 shows a structure substantially the same as that of FIG. 8, except that the chamber 114 between the inner surface of the seal 106 and the sleeve 110 is formed by relieving the inner surface of the seal, as at 122. Fluids within the valve will tend to close the chamber 120, thus biasing the port seal 118 into firm contact with the stem. It is important to recognize that it is the force of the fluid within the valve which creates the force upon the port seal area to hold it in firm contact with the stem.

In FIG. 10, the seal disclosed herein is applied to a stop valve or a shut-off valve. A body 130 has an inlet 132 and an outlet 134. Within the hollow body 130 there is a valve member 136 connected to an exterior handle 138. A cap or collar holds the valve member with the body and positions a sleeve 142 which surrounds the valve member. An O-ring 144 forms a seal between the interior of the sleeve and the upper portion of the valve member.

A seal 146 having a port seal portion 148 is positioned within an inlet opening 150 in the sleeve. The seal 146 is arcuate to conform with the surface of the sleeve and has a conical cross section to conform to the inner conical surface of the body 130. The seal construction includes a relieved area 152 similar to that shown in FIG. 9 to apply sealing pressure to the port seal area.

The valve member 136 has a notch 154 which extends generally halfway through the valve member so that when the valve is moved to the open position, fluid may flow from the sleeve inlet 150 to the sleeve outlet 156. The conical arcuate seal 146 provides a complete seal when the valve is closed, preventing any flow of fluid beyond port seal 148. In the open position O-ring 144 provides the necessary seal.

The valve of FIG. 11 is similar except that body 160 has a bottom discharge 162. The seal 146 is the same as in FIG. 10 as is the sleeve 142, except for its discharge. The valve member 164 is hollow and has a port 166 which, in the open position, connects the interior of the valve member with the sleeve inlet 150.

FIGS. 12 and 13 show a modified form of the invention in which the seal disclosed herein is applied to a slide-type of valve. A first member or slide is indicated at 170 and may move back and forth adjacent a second member or valve member 172. A third member 174, which may be a housing or the like, has a port 176, with slide member 170 having a port 178 and valve member 172 having a port 180. All three ports are in alignment in the position shown, although as indicated by arrows 182, the slide member moves back and forth to place its port either into or out of registry with the ports 176 and 180. Positioned within port 180 is a seal member 184 having a port seal portion 186 and a rim 188 in contact with the slide 170. A body portion 190 extends laterally outwardly from the port seal portion 186 and may fit within a recession 192 formed in the valve member 172. A supporting eyelet is indicated at 194 and may have a flange 196 which rests upon the body portion and a cylindrical portion 198 which extends into the port seal portion 186.

In operation, fluid flowing in the direction of arrow 200, assuming that slide 170 is in the position shown, will pass through all three aligned ports. The slide may be moved back and forth to prevent fluid flowing through port 178. The seal 184 seals against all three members, slide 170, the valve member 172 and the third member or housing 174. The body portion may be to some extent squeezed between valve member 172 and housing 174. Fluid pressure within the ports applies an inwardly-directed force upon the port seal portion 186 to keep the rim 188 in firm contact with the slide 170. The supporting eyelet or tube may be necessary in some applications, but not in others. When used, it merely serves as a support for the inner diameter of the seal member. In some applications it may be desirable to support the outer diameter of the seal member. In any event, what is important is that the seal member is effective against three different parts, one of which is movable relative to another, and in which the force of fluid within the valve, although not necessarily flowing through the valve in the open position, provides additional sealing force to keep the rim 188 in firm contact with the slide 170.

In the valve of FIGS. 14, 15 and 16 a housing is indicated generally at 210 and has spaced inlet ports 212 and 214 and a discharge port 216. A valve chamber is indicated generally at 218 and is in communication with inlet ports 212 and 214 and the discharge port 216.

Positioned within the chamber 218 is a sleeve 220 having an inner bore 222 which contains rotatable pistons 224 and 226. Snap rings or the like 228 and 230 prevent removal of the pistons from chamber 218. Each of the pistons 224 and 226 have flatted ends 232 and 234 to receive a conventional turning member, such as a handle or the like. The pistons 224 and 226 rotate to control the volume of the fluid passing from the two inlets to the two outlets. The structure shown in FIGS. 14, 15 and 16 functions as a two-handle valve to control two different fluids passing from the two inlets to a common discharge. Each of the pistons 224 and 226 have passages 236 and 238 extending radially through the pistons to direct the fluid from sleeve inlets 240 and 242 to the sleeve outlets 244 and 246. Both of the sleeve outlets are in communication with the common housing discharge 216.

The exterior surface of sleeve 220 adjacent its inlet ports 240 and 242 has a partially circumferentially extending recess 248 which extends axially and circumferentially in both directions from the ports 240 and 242. The recess 248 receives a seal member indicated generally at 250. The seal member 250, illustrated in detail in FIG. 15, has port seal portions 252 and 254 which extend inwardly through the sleeve ports 240 and 242 and into sealing engagement with the rotatable pistons 224 and 226. Surrounding the port seal portions are a pair of beads or rims 256 and 258 which are in sealing contact with the interior surface of the housing 210 about the housing inlet ports 212 and 214. Thus, the seal member 250 has port seal portions which extend inwardly through the inlet ports to be in sealing contact with the pistons and has sealing surfaces 256 and 258 which are in sealing contact with the interior of the housing. Additional spaced rims or beads 260 and 262 extend peripherally about the seal member 250 and are also in sealing contact with the interior of the housing or with the surface of the chamber 218.

In operation, fluid from the inlets 212 and 214 will be controlled by movement of the two pistons 224 and 226 to provide for a mixed discharge from the discharge area 216. Manipulation of the pistons is effective to control the register of passages 236 and 238 with the inlet ports to control volume of fluid flowing from each of the inlets to the discharge. The seal member, as is true with the other forms of the invention, is in sealing contact with three different members, the inner movable members or pistons 224 and 226, the exterior surface of a portion of the sleeve, and the interior portion of the housing. The seal is firmly anchored to the sleeve as it is positioned in recess 248 and thus cannot be removed by a sudden application of pressure to the valve.

The seal shown may be used in a variety of valve applications. It may be arcuate, cylindrical, or tapered or conical. It may have one or more port seal portions. What is important is to provide inwardly-directed pressure on the port seal portion.

Of importance in the invention is the manner in which the seal is anchored to the sleeve, not only to firmly hold the seal in position during insertion and removal of the valve, but also to prevent the seal from being forced through a discharge opening by a sudden application of pressure.

Sealing pressure is applied in various ways. Pressure from fluid present at the valve inlet produces sealing pressure, as does flexure of a portion of the seal and squeezing of a portion of the seal between parts of the valve.

In all forms of the invention the port seal portion of the seal is free to move relative to the sleeve. The seal is anchored on the sleeve in a removable or replaceable manner. Even when so anchored, the port seal portion is free to move relative to the surrounding wall of the sleeve in accordance with variations in water pressure. The water pressure within the port creates the pressure by which the port seal portion seals against the movable stem. The inner rim of the seal is the termination of the port seal portions and hence there is no restriction on movement of the port seal portion relative to the sleeve. There is permissible free movement of the port seal portion which provides the sealing pressure against the stem and which permits the seal to compensate for wear. The greater the water pressure, and hence the more sealing pressure required, the greater is the actual sealing pressure applied by the port seal portion against the stem.

Whereas the preferred form of the invention has been shown and described herein, it should be realized that there may be many modifications, substitutions and alterations thereto.

I claim:

1. A seal for use in a valve having a hollow sleeve, a fluid mixing means movable within the sleeve, spaced fluid inlet ports in the sleeve communicating with the means, and a housing enclosing the sleeve, said seal including port seal portions extending through the sleeve ports and each having inner rims in sealing contact with the means, a body portion generally cylindrical about the axis of the means and integral with said port seal portions, said body portion having an internal generally cylindrical surface fitted against the exterior surface of the sleeve, said body portion having portions thereof in sealing contact with an internal surface of the housing, said body portion cooperating with the housing and defining fluid chamber means in alignment with the port seal portions, with fluid in the chamber means providing pressure to urge said port seal portions toward the mixing means, said port seal portions being freely movable relative to the sleeve ports for applying sealing pressure by the rims against the mixing means.

2. The structure of claim 1 further characterized by and including peripheral rims positioned at opposite ends of said seal member and adapted to be in sealing contact with the interior surface of the housing.

3. The structure of claim 1 further characterized in that said body portion is squeezed between said sleeve and housing members.

4. The structure of claim 1 further characterized by chambers formed between the inner surface of the seal body portion and an outer surface of said sleeve, fluid flowing through the port seal portions reducing the size of the chambers while biasing the port seal portions toward said mixing means.

5. The structure of claim 4 further characterized in that said chambers extend annularly about said port seal portion.

6. The structure of claim 4 further characterized in that said chambers are formed by relieved area on the exterior of said sleeve.

7. The structure of claim 1 further characterized in that that portion of each port seal portion which is adapted to extend through the port in the sleeve is greater in axial extent than the width of the surface forming the port in the sleeve.

8. The structure of claim 1 further characterized by and including at least one peripheral rim extending about the surface of said seal and adapted to be in sealing contact with the interior of the housing.

* * * * *